United States Patent [19]

Pavey et al.

[11] Patent Number: 5,530,907
[45] Date of Patent: Jun. 25, 1996

[54] MODULAR NETWORKED IMAGE PROCESSING SYSTEM AND METHOD THEREFOR

[75] Inventors: Kent Pavey, Oakland; David Feitelberg, El Cerrito, both of Calif.

[73] Assignee: TCSI Corporation, Berkeley, Calif.

[21] Appl. No.: 111,339

[22] Filed: Aug. 23, 1993

[51] Int. Cl.⁶ ................ G06F 3/14; G06F 13/10
[52] U.S. Cl. .................... 395/889; 364/DIG. 1; 364/DIG. 2; 364/419.1; 364/419.08; 364/419.09; 382/309; 358/400
[58] Field of Search ............ 395/800, 155, 395/325, 275, 200, 500, 147, 148, 61, 600, 144, 134, 161; 364/DIG. 1, DIG. 2, 406, 408, 403.1, 401, 146, 514 R; 235/375, 456, 468, 462; 382/30, 41, 17, 187, 178, 230, 161, 228, 186, 189, 315, 197; 358/402, 468, 401, 405, 434, 435, 436; 379/100; 380/17, 18

[56] References Cited

U.S. PATENT DOCUMENTS

| | | | |
|---|---|---|---|
| 3,564,504 | 2/1971 | Morenoff et al. | 395/650 |
| 4,091,423 | 5/1978 | Branscome | 380/18 |
| 4,156,867 | 5/1979 | Bench et al. | 371/37.1 |
| 4,404,628 | 9/1983 | Angelo | 395/200.08 |
| 4,414,624 | 11/1983 | Summer, Jr. et al. | 395/650 |
| 4,491,725 | 1/1985 | Pritchard | 235/375 |
| 4,539,637 | 9/1985 | DeBrouler | 395/650 |
| 4,571,699 | 2/1986 | Herzog et al. | 395/200 |
| 4,591,977 | 5/1986 | Nissan et al. | 395/200.08 |
| 4,607,290 | 8/1986 | Murakami | 358/410 |
| 4,616,854 | 10/1986 | Landrum et al. | 283/74 |
| 4,648,035 | 3/1987 | Favh et al. | 395/412 |
| 4,667,292 | 5/1987 | Mohlenbrock et al. | 364/406 |
| 4,724,309 | 2/1988 | Greene | 235/468 |
| 4,760,606 | 7/1988 | Lesnick et al. | 382/48 |
| 4,847,755 | 7/1989 | Morrison et al. | 395/650 |
| 4,858,121 | 8/1989 | Barber et al. | 364/406 |
| 4,876,648 | 10/1989 | Lloyd | 364/408 |
| 4,881,164 | 11/1989 | Hailpern et al. | 395/417 |
| 4,937,439 | 6/1990 | Wanninger et al. | 235/456 |
| 4,965,717 | 10/1990 | Cutts, Jr. et al. | 395/182.1 |
| 4,972,496 | 11/1990 | Sklaren | 382/187 |
| 4,985,831 | 1/1991 | Dulong et al. | 395/650 |
| 4,985,895 | 1/1991 | Pelkey | 371/37.1 |
| 4,987,538 | 1/1991 | Johnson et al. | 364/401 |
| 4,991,079 | 2/1991 | Dann | 395/200.08 |
| 5,014,328 | 5/1991 | Rudak | 382/17 |
| 5,023,435 | 6/1991 | Deniger | 235/375 |
| 5,025,396 | 6/1991 | Parks et al. | 395/147 |
| 5,038,392 | 8/1991 | Morris et al. | 382/61 |
| 5,056,000 | 10/1991 | Chang | 395/290 |
| 5,070,452 | 12/1991 | Doyle, Jr. et al. | 364/401 |
| 5,081,688 | 1/1992 | Sakuragi | 382/11 |
| 5,084,769 | 1/1992 | Miura | 379/100 |
| 5,091,790 | 2/1992 | Silverberg | 358/434 |
| 5,093,916 | 3/1992 | Karp et al. | 395/700 |
| 5,127,013 | 6/1992 | Yoshida | 371/32 |
| 5,129,085 | 7/1992 | Yamasaki | 395/162 |
| 5,133,024 | 7/1992 | Froessl | 382/41 |
| 5,134,501 | 7/1992 | Satomi et al. | 358/400 |
| 5,163,131 | 11/1992 | Row et al. | 395/200.01 |
| 5,172,246 | 12/1992 | Yoshida | 358/406 |
| 5,177,625 | 1/1993 | Nakashima et al. | 358/468 |
| 5,191,525 | 3/1993 | LeBrun et al. | 364/419.1 |
| 5,200,993 | 4/1993 | Wheeler et al. | 379/96 |
| 5,202,987 | 4/1993 | Bayer et al. | 395/650 |
| 5,257,372 | 10/1993 | Furtney et al. | 395/650 |
| 5,261,009 | 11/1993 | Bokser | 382/230 |
| 5,271,068 | 12/1993 | Ueda et al. | 382/30 |
| 5,272,764 | 12/1993 | Bloomberg et al. | 382/9 |
| 5,287,199 | 2/1994 | Zoccolillo | 379/100 |
| 5,335,292 | 8/1994 | Lovelady et al. | 382/17 |

*Primary Examiner*—Daniel H. Pan
*Attorney, Agent, or Firm*—Ronald L. Yin; Limbach & Limbach

[57] ABSTRACT

A modularly configured networked document processing system has a plurality of computers communicating over a local area network. The system has fax servers and scanners to convert documents into image signals, work stations to recognize character signals from the image signals, to process the character signals, and to display the unintelligible processed character signals for user intervention. In addition, the system has a gateway for communication to a mainframe computer.

39 Claims, 2 Drawing Sheets

Microfiche Appendix Included       (32 Microfiche, 1664 Pages)

MODULAR NETWORKED IMAGE PROCESSING SYSTEM AND METHOD THEREFOR

This application is submitted with a microfiche appendix, having Exhibits A, B, C, D, E, F, G, H, I, and J, containing copyrighted material, Copyright 1993, Teknekron Communication Systems, Inc. The Appendix consists of Exhibit A: two (2) microfiches with 74 frames;
Exhibit B: three (3) microfiches with 180 frames;
Exhibit C: six (6) microfiches with 361 frames;
Exhibit D: two (2) microfiches with 81 frames;
Exhibit E: six (6) microfiches with 345 frames;
Exhibit F: two (2) microfiches with 121 frames;
Exhibit G: three (3) microfiches with 141 frames;
Exhibit H: four (4) microfiches with 205 frames;
Exhibit I: two (2) microfiches with 71 frames;
Exhibit J: two (2) microfiches with 85 frames;

The copyright owner has no objection to the facsimile reproduction by anyone of the patent document or the patent disclosure, as it appears in the Patent and Trademark Office patent file or records, but otherwise reserves all copyright rights whatsoever in the appendices.

TECHNICAL FIELD

The present invention relates to an electronic computerized system for processing documents having information fixed thereon and more particularly, to a document processing system for receiving documents transmitted by facsimile, and having a plurality of modular, processing units, communicating with one another over a communication bus.

BACKGROUND OF THE INVENTION

Document processing systems for processing documents which had been faxed or scanned onto the system and having character recognition capability is well known. See, for example, U.S. Pat. Nos. 4,491,725; 4,616,,854; 4,667,292; 4,858,121; 4,937,439; 5,023,435; and 5,070,452.

U.S. Pat. No. 4,724,309 appears to disclose a scanning mechanism for scanning documents and having a reject pocket 28 to reject unintelligible documents. U.S. Pat. No. 4,987,538 discloses a manual processing override for manually processing documents due to abnormalities which is then re-entered into the processing system.

None of the references identified hereinabove, discloses a document processing system which can process documents received by facsimile or by scanning means, and is modularly expandable and further having capability for correcting unintelligible characters.

Finally, it is well known in the computer industry to use so called parity bits as a means to ensure the accuracy of data bits written to or read from a medium. The parity bits serve as a check on the data bits.

However, heretofore, the prior art does not disclose any method or apparatus to check the accuracy of the printed characters transmitted, by, for example, facsimile.

SUMMARY OF THE INVENTION

In the present invention, a document processing system can process a plurality of documents each of which has information fixed thereon, with a portion of the information being in the nature of alphanumeric characters. The system comprises a communication bus. In addition, the system has means for converting the plurality of documents into a plurality of image signals with the converting means electrically connected to the communication bus for supplying the image signals thereto. The system also has means for processing the image signals to produce a plurality of character signals. The character signals represent the alphanumeric characters and their associated meaning. The processing means is electrically connected to the communication bus and receives the image signals therefrom and supplies the character signals thereto. The system also has means for analyzing the character signals and assigns a confidence level for each of the character signals and for displaying those character signals having a confidence level below a certain threshold for manual alteration by a user to produce processed character signals. The analyzing means is electrically connected to the communication bus for receiving the character signals therefrom and for supplying the processed character signals thereto. The system also has means for connecting to additional communication buses and for communicating and translating image signals, character signals, or processed character signals between communication buses. Finally, a storage means stores the image signals, the character signals, and the processed character signals with the storing means electrically connected to the communication bus.

DETAILED DESCRIPTION OF THE DRAWINGS

Figure 1:
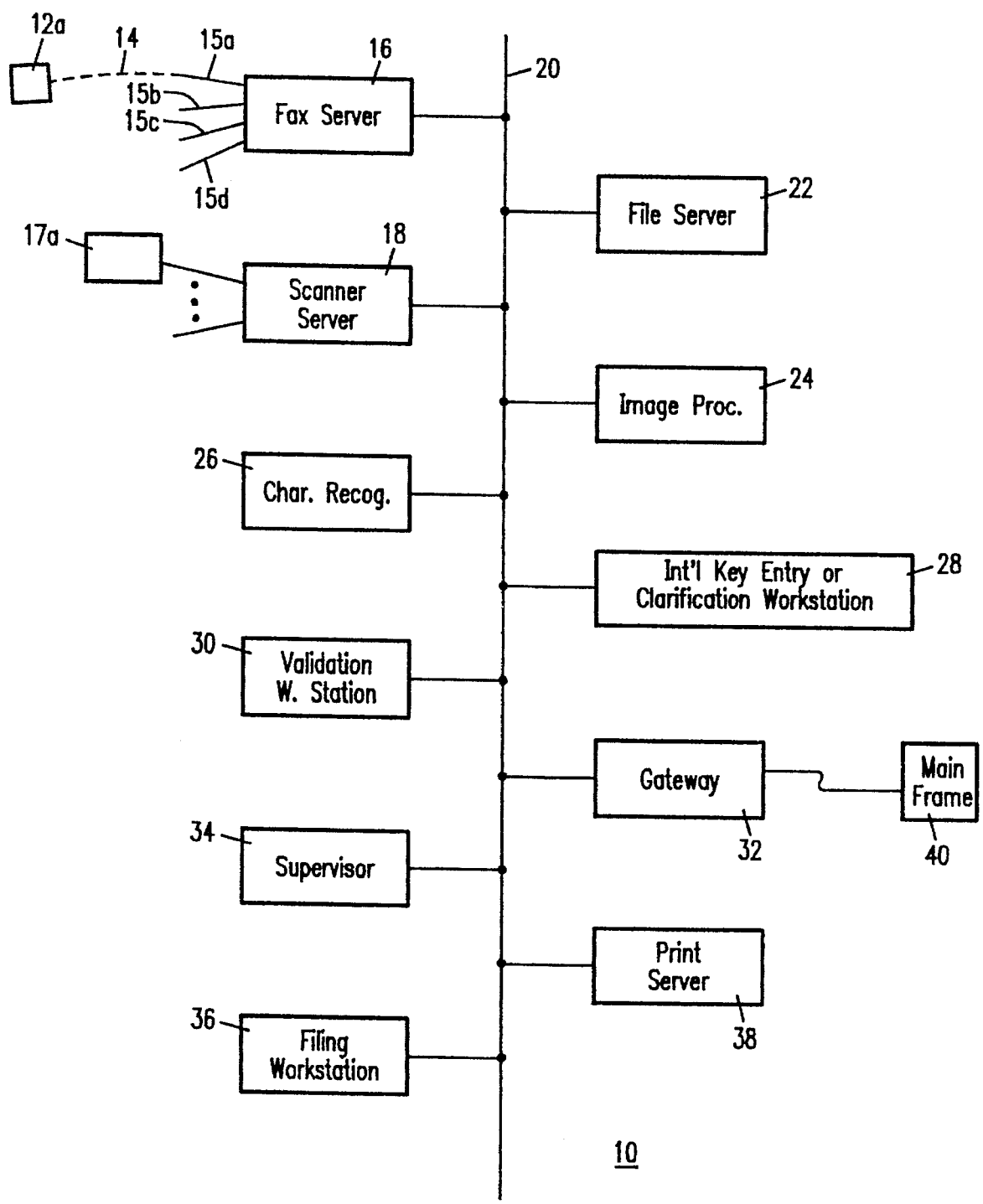
FIG. 1 is a block level diagram of the document processing system of the present invention.

Referring to FIG. 1, there is shown a block level diagram of a document processing system 10 in accordance with the present invention. The system 10 can process any kind of document with information fixed thereon with a portion of the information being in alphanumeric characters. This includes, but is not limited to, documents of a form nature with a template. One example of this type of document is a health claim form, such as the form HCFA-1500. The system 10 can process a plurality of documents in a batch or each document individually.

The health claim form can be transmitted via a facsimile 12a from a health provider's office. Many health care providers, each with a facsimile 12(a,b, . . . ) can be simultaneously supplying health care forms to the system 10. Each of the facsimiles 12(a,b, . . . ), such as the facsimile 12a, converts each of the health claim forms into an image signal for transmission over a public telecommunication network 14. In the preferred embodiment, the health claim form is a document with its template printed in green color, with the alphanumeric data typed or machine printed in black ink. Alternatively, the health claim form can be a plain white paper document with no template, and with the alphanumeric data typed or printed in black ink in the proper locations as if a template were present. The facsimiles 12(a,b, . . . ) would not detect the green ink. Thus, the image signal transmitted by each facsimile 12 would contain only the printed alphanumeric data. Each image signal from a facsimile 12 is received by a fax modem 15a. The fax modem 15a can be one of a plurality of fax modems 15(a,b, . . . ) which are connected to and are under the control of a fax server 16, whose function will be described in greater detail hereinafter.

From the fax server 16, the image signal is supplied to a communication bus 20 to a file server 22. The image signal is stored on the file server 22 at a first pre-assigned directory, or storage location.

Alternatively, the health claim form can be mailed to the site of the system 10. The health claim form is then converted by an optical scanner 17a into an image signal. In the preferred embodiment, the optical scanner 17a, similar to the facsimile 12a, has a light source to "drop out" the color of the template of the document being scanned. The optical scanner 17a can be one of a plurality of optical scanners 17($a,b, \ldots$), which are connected to and are under the control of a scanner workstation (or controller) 18, whose function will be described in greater detail hereinafter.

The image signal data from the scanner workstation (or controller) 18 is supplied to the communication bus 20 and is stored on the file server 22 at a second pre-assigned directory or storage location.

In yet another alternative embodiment, each of the optical scanners 17($a,b, \ldots$) can be located remotely at a health care provider's office or a regional processing center. The optical scanners 17($a,b, \ldots$) are then connected through a public or private telecommunication network to the scanner workstation 18.

In any event, an image signal, representative of each page of the health claim document, is stored on the file server 22 at a pre-assigned directory or location.

The image signal from the initial storage location of the file server 22 is retrieved by an image processor 24, connected to the bus 20. The image processor 24 will be described in greater detail hereinafter. However, the image processor 24 generally processes the image signals to produce a processed image signal which is supplied to the bus 20 and is stored on the file server 22. The processed image signals are stored in a second pre-assigned directory different from the first directory to which the image signals are stored. The image processor 24 improves the image signal to produce the processed image signal by, for example, removing speckle, enhancing resolution, deskewing, aligning registration etc. In addition, the image processor 24 extracts meaning from the image signal. A portion of the full page image is labelled "name of patient".

The processed image signal is retrieved from the second directory of the file server 22 and placed on the bus 20 to the character recognition processor 26. The character recognition processor 26, which will be discussed in greater detail hereinafter, generally recognizes those portions of the processed image signal which is printed information that is not a part of the background form and converts them into character signals. In addition, the associated meaning of the character signals is extracted by the character recognition processor 26. Thus, for example, if a field located in a particular position refers to the name of the patient, printed or written as "John Doe", the extracted character signal would contain the character signal "John Doe" as well as the associated meaning of that character signal such as "name of patient". Thus, the character recognition processor 26 generates in the character signal, the most likely ASCII character. In addition, the character recognition processor 26 assigns a confidence level for each character signal extracted from the processed image signal. Finally, the character recognition processor 26 generates data indicating the location and size of each character. The data extracted by the character recognition processor 26 from the processed image signal is then stored through the communication bus 20 onto the file server 22, at a third pre-assigned directory, different from the first and second directories.

The character signal, along with the associated meaning, as well as the confidence level of the characters and the position of their location, are retrieved by an intelligent key entry or clarification work station 28 from the third directory of the server 22. The clarification work station 28, which will be described in greater detail, generally compares the character signals to a database. Thus, for example, if a database contains all defined diagnostic codes in the corresponding field, the clarification work station 28 can compare the character signal for the field that contains the diagnosis codes extracted by the character recognition processor 26 and determine whether or not the character signal extracted therefrom corresponds to a valid diagnosis code. The database is organized with "key" and "dependent" fields. A key field provides the index with which the clarification work station 28 can find any "dependent" data. An example would be a patient information database which associates name and addresses with an individual's identification number. Sorting this database in identification number order allows the clarification work station 28 to look up quickly a name and an address.

The clarification work station 28 then compares the character signal to the key field portion of the database. If the key field is not found, then confidence in all of the characters of the character signal is reduced by a constant large enough to guarantee manual correction (discussed hereinafter). Confidence in any dependent field is unchanged.

If a key field is found in a database, confidence in all the characters is increased by a constant.

If a dependent field of the character signal matches what is found in the database, confidence in all characters is increased by a constant large enough to inhibit key entry.

If a dependent field of the character signal does not match the database, and the number of mismatched characters is small (small compared to some user, preset threshold), then the clarification work station 28 substitutes the database value for the character signal results and generates the processed character signals to replace the character signals. All the confidence in those characters is raised enough to inhibit manual correction.

Finally, if a dependent field does not match what is found in the database and the number of mismatched characters is greater than the preset threshold, confidence levels for both dependent and key fields are decreased by a constant large enough to guarantee manual correction.

The clarification work station 28 also offers a human operator an opportunity to inspect the result of the processing. Based upon the result of comparison to the database, the character signals having the confidence level below a preset threshold and the portion of the image signal corresponding to those character signals are then displayed on a monitor of the clarification work station 28 for manual intervention. The user either acknowledges the processed character signals as correct character signals or enters the corrected character signals. Collectively, these are the processed character signals which are then stored back onto the file server 22 through the communication bus 20, at a fourth pre-assigned directory, different form the first, second and third directories.

The processed character signals from the fourth directory of the file server 22 are then retrieved by a validation work station 30 through the communication bus 20. The validation work station 30 also attempts to detect and correct errors in the processed character signals much like the clarification work station 28. However, the mechanism for correcting errors differs between the clarification work station 28 and the validation work station 30.

The validation work station 30 uses an embedded expert system to make inferences about groups of related fields. In contrast, as discussed heretofore, the clarification work station 28 merely compares the character signals to a pre-existing database. In the operation of the validation work station 30, for example, diagnosis codes can be compared to procedure codes to ensure that the billed treatment is relevant to the described disease. This testing of the correctness of the processed character signals is applied even to those processed character signals having a high confidence level. Only those fields which appear as exception to the expert systems are then highlighted to a user for review for possible correction. In addition, low confidence fields for which the operator at the clarification work station 28 declined to manually intervene are also presented at each validation work station 30. Therefore, the validation work station 30 serves to display the original full page image along with a data entry display, with the diagnostic message describing the exception condition in a fixed screen location. If the user determines the claim was transcribed incorrectly, the data can be edited at the validation work station 30. If the original claim was processed correctly but nevertheless was prepared incorrectly, the processed character signals are left as is.

Alternatively, the user at the validation work station 30 can generate a message, stored on the file server 22, for processing by the mainframe 40 (described hereinafter) alerting the mainframe 40 to this discrepancy. In addition, the message can be faxed back to the health provider through the fax server 16 along with the processed character signals and the image signals with a request for clarification.

After processing by the validation work station 30, the resultant character signals are then retrieved by a gateway 32 which converts the character signals into a data structure, for example the National Standard Format (NSF) for electronic media claims, suitable for transmission to another computer 40 and transmits those processed character signals to that computer 40 such as a mainframe computer 40. In addition, the gateway 32 can transmit the image signals, the processed image signals, character signals, or the processed character signals to the other computer 40. The mainframe computer 40 would then process the signals, in electronic form, from the gateway 32.

The system 10 also comprises a supervisory station 34. The supervisory station 34 serves to administer the system 10. Functions include monitoring the status of all work in the system, adding and removing users, triggering periodic (e.g. end of the day) processes, and changing system configuration.

The system 10 also comprises a print server 38. The print server 38 serves to produce paper copies of images that are not valid health claims and to print end of day reports. Paper images may be non-HCFA claims, supporting documentation, or other material. These printouts can be used in other parts of the health claim processing procedure. End of the day type of reports allows the health claim processing carrier to monitor the usage of the system 10 and to predict monthly service fees. Conventional laser printers are attached to the print server 38.

Finally, the system 10 comprises a filing work station 36. The filing work station 36 permits operator review and correction of form classification. All supporting documentation and non-claim images from the fax server 16 or from the scanner workstation 18 are routed to the filing work station 36. An operator thereon views the image data and can either pass the non-health claim processing document to the print server 38 for print out or send the misrouted health claim processing document back onto the file server 22 for storage for further processing by the character recognition processor 26.

In the preferred embodiment, the system 10 is a local area network operating under the control of Novell LAN software, with each of the fax server 16, scanner workstation 18, character recognition processor 30, supervisor station 34, filing work station 36, file server 22, image processor 24, clarification work station 28, and print server 38, comprised of an IBM PC compatible computer with additional expansion hardware, including coprocessors, executing appropriate software.

Fax Server

The fax server 16 is an IBM PC compatible computer managing a plurality of fax modems 15$(a,b, \ldots)$. In the preferred embodiment, each of the fax modems is an Intel SatisFAXtion model 200 plug-in board for the IBM PC. Thus, the server 16 can accept several fax image signals simultaneously.

The computer 16 has an intelligent, buffered serial channel. In the preferred embodiment the system 10 is operating under the Netware network software of the Novell local area network operating system. The fax server 16 executes an application program to control the fax modems 15 and the storage of the images signals to the file server 22 through the bus 20. A copy of the program is set forth in a microfiche appendix Exhibit A. In addition, the server 16 executes the DOES program (a program available from Teknekron Communications Systems, Inc. of Berkeley, Calif.) to interface the application program with the network 10 and synchronize multiple simultaneously executing instances of the program set forth in Exhibit A.

The fax server 16, executing the program of Exhibit A, manages all the connected fax modems 15$(a,b, \ldots)$ such that incoming calls are answered whenever a modem 15 is available. Modem data is not lost during other CPU operations such as during file I/O operations. Further, aborted transmissions on the telecommunication line 14 do not crash the fax server 16. Finally, telephone lines 14 are released when the carrier signal is lost.

The image signals received by the fax server 16 are bilevel images of HCFA-1500 claims at either 200 dpi in horizontal and vertical dimensions or 200 dpi horizontal and 100 dpi vertical dimension. The fax server 16 accepts image signals compressed using CCITT group 3 specification.

The fax server 16 creates a data file in the first directory on the file server 22 whenever it has successfully received a plurality of image signals representing one or more document images. However, one or more data files are used for each separate facsimile transmission. The fax server 16 does not mix documents from several simultaneous transmission into a single batch data file. Files that are open, which receive document images, are closed under the following conditions:

a. A file reaches a parametrically defined number of single page images;

b. The transmission ends for that session for any reason;

During the time a facsimile transmission is in progress, the data file is opened in the first directory in the file server 22. Since a plurality of fax servers 16 can be connected to the communication bus 20, each of the fax servers 16 has a cooperative naming scheme to prevent overriding each other's files. The file server 22 has another directory which contains a file whose contents are the next available names for a fax server data file. When a fax server 16 needs to create a data file, it locks and opens that file, reads then updates the contents, closes the file and releases the lock.

Only successfully received image signals representative of pages are written into the designated files. If communication fails while the page of image signals is being sent, data for the partially completed page is discarded.

The fax server 16 also notes the telephone number of the caller through data present in the communication channel between the caller and the fax server 16. This can be accomplished by for example examining the transmit terminal identifier (TTI), which is a code generated by the transmitting facsimile 12, indicating the telephone number of the caller. In addition, where ANI (Automatic Number Identification) service is offered by the public communication network 14 service provider, the ANI indicates the identity of the caller. The caller number is stored along with the image signal on the file server 22. Finally, the fax server 16 appends a statistical block to each file it generates. Included are data for:

a. receiving modem ID;

b. receive time;

c. caller ID;

d. number of single page images in the file;

e. total bytes received; and f. resolution.

Finally, the fax server 16 can fax back to the originator of the original image signal or any other location, of any of the following type of information generated by the system 10.

a) A summary report of the number of claims received in a particular period of time, such as by day or by week;

b) An error report back to the originator of the image signal that the image signal cannot be processed, such as the image signal being too light or too noisy;

c) A remittance report generated by the mainframe computer.

Scanner Workstation

The scanner workstation 18 is similar to the fax server 16. Health claim forms such as HCFA-1500 claims are mailed to the site of the system 10 and are optically scanned by the scanner 17, which converts each document image into an image signal. As previously discussed, alternatively, each of the scanners 17 can be located at a health care provider's office (or a regional processing center), and is remotely connected to the scanner workstation 18. Each single page of the document is converted into a 200 dpi bi-level image. In a preferred embodiment, scanner station 18 is also another IBM PC compatible computer 18 having intelligent, buffered scanner subsystem.

Similar to the fax server 16, a data file is opened in the first directory of the file server 22. Since the system 10 can accommodate a plurality of scanners 17, either locally or remotely connected, (by modularly adding another scanner 17), a plurality of scanners 17 can be employed in the system 10, with each scanner having a corresponding scanner workstation 18 connected to the system 10. All of the scanner workstations 18 have a cooperative naming scheme so as to prevent overriding each other's files. The file server 22 contains a directory containing a file having the next available name for each scanner workstation 18. When a scanner workstation 18 needs to create a data file, it locks and opens that file, reads then updates the contents, and then closes the file and releases the lock—all similar to the operation of the fax server 16.

Again, similar to the fax server 16, the scanner workstation 18 creates a new batch whenever it needs to record an image signal and no file is opened. After the file is opened, the scanner workstation 18 closes the file upon the following conditions:

a. The scanner workstation 18 is stopped by an operator;

b. No pages have been scanned for a set period of time, such as 10 seconds. Error conditions such as feeder empty or is jammed are detected and are reported by the workstation 18; or c. The current batch in the data file contains a parametrically determined number of single page images.

To provide a useful feedback to the operator of the scanner workstation 18, in the preferred embodiment, the scanner workstation 18 displays the status of the scanner workstation 18 on its monitor as well as displaying an image fragment of the document as it is being scanned, to provide visual feedback to the operator of a successful scanning operation. In addition, diagnostic messages for common scanner problems would be available on the display of the scanner workstation 18. Indicator such as paper jam locations, etc. should be displayed.

Finally, the scanner workstation 18, similar to the fax server 16, appends a statistical block to each batch file it generates. This data includes:

a. Scanner workstation name;

b. The scan time;

c. A document identification number;

d. The number of single page images scanned and are stored in the file opened on the file server 22;

e. Total image bytes in the file;

f. Resolution.

In the preferred embodiment, each of the scanners 17 is made and sold by Improvision of Emeryville, Calif. The scanner workstation 18 is an IBM PC compatible computer with an image controller card from Seaport Imaging, Inc. of Santa Clara, Calif. The workstation 18 executes the program set forth in microfiche appendix Exhibit B. In addition, the computer 16 executes the DOES program to interface the program set forth in Exhibit B with the user.

Image Processor

The image processor 24 receives the image signals stored in the first directory of the file server 22. The image signals, as previously discussed, can originate from either the fax server 16 or the scanner workstation 18. The file server 22 retrieves the image signals from the files created by the fax server 16 and the scanner workstation 18 and transmits them to the image processor 24 via communication bus 20.

The image processor 24 receives the image signals and performs operations thereon to improve the character recognition performed by the character recognition processor 26. Among the functions performed by the image processor 24 include:

A. Context Sensitive Processing

In this function, the processor 24 processes the image signals to deskew, i.e. to correct skew, i.e. line fitting to the data to determine the skew, if any, from the horizontal; to register the image signals; and to enhance the resolution of the image signals.

The processor 24 adaptively selects different processing algorithms as the image signal is processed. Thus, for example, in image deskew, the original document may have been fed initially, incorrectly, into the fax machine i.e. with a skew. However, as the document is scanned by the originator's fax, the document may then straighten out. Thus, the electronic image signal received would consist of a portion which is initially skewed, and then aligned. The processor 24, as it processes the electronic image signal, would initially select an algorithm to compensate for the initial skew. However, after the image signal is detected to be straight or aligned with the horizontal, the processor 24 would employ a different algorithm for the same image signal.

Similarly, in image registration, the image signal is first scanned for textual areas. All possible positions of the template are compared to the found text areas. The closest match between the template and the found text is the location of the data field. This expected data field is larger in area than the field of the would be actual data based upon the template. Within the expected field the image is scanned for the expected data. Once the expected data is found, its location relative to the next data field to be searched, is then recalculated. The expected location of the next data field is re-calculated in relationship to the boundaries of the field just determined. In this manner, as each data field is found, and its location determined, the relative position of the next data field to be determined is adaptively recalculated.

Another characteristic of the image signal is pixel resolution. In enhancement of image pixel signal, an image of a character is composed of a plurality of pixels. However, in the transmission process, one or more of the pixels may be subject to noise, and may not have been transmitted. Thus an "O" may be transmitted and received as a "C". If a pixel is found, there are eight nearest neighbor pixels. A number of algorithms, such as dilation algorithms, can be used to attempt to "enhance" the missing pixel(s). For example, all eight nearest neighbors, may be filled in, or only the two pixels in a direct vertical line are filled in, or only the two pixels in a horizontal line are filled in, or none are filled in. The processor 24 first measures certain image characteristics such as the mean print density. Based upon the mean print density measured, the processor 24 chooses which enhancement algorithm to apply to the image signal.

Other characteristic of the image signal includes the spatial distribution of the pixels over a portion or over the entire image signal. The spatial distribution of the pixels of a portion of the image signal is processed and is used to select the algorithm to be used in processing the remainder portion of the image signal.

B. Identification of Form

The processor 24 performs an identification of the form represented by the image signal based on recognizing an identifying mark, such as a bar code, or the TTI, or the ANI, or by correlation of the image signal with a number of pre-defined form types.

There are many methods that can be used to identify the form used. First, in the preferred embodiment, the system 10 attempts to match the received image signal with a number of pre-defined form types, to determine which of the types the received image signal fits.

In another embodiment, the original image may be transmitted using an identifying mark, such as a bar code. Thereafter, the system 10 receiving the transmitted electronic image would decode the bar code, and determine the form on which the character signals are supplied, based upon the bar code detected.

Alternatively, based upon the transmit terminal identifier, or the ANI, from the originator, if the transmit terminal identifier or the ANI from the originator always uses a certain type of form, such as in the transportation industry, then the form on which the characters are printed can be determined and removed from the image signal.

C. Removal of the Background/Template

Once the template form is identified, the image processor 24 uses well known prior art techniques for removal of the background form of the document, represented by the image signal.

D. Removal of Speckle

The image processor 24 uses well known prior art techniques to remove speckle on the image signals which is an electronic representation of the document.

E. Mark Sense Recognition

In this processing technique, certain aspects of a form, such as a "check-box" can be used to determine the type of form, or can be used to position the data to be recognized. The location of the one or more "check-boxes" can be used to determine the type of form, as well as indicating the position of the character data in the image.

F. Field Clipping of Image Signal

As discussed hereinabove, the area surrounding the expected data field is clipped, and the fragmented image signal is stored for further processing by the character recognition workstation 26. This includes the placement of image data fields on a white background. The position of the expected data field is adaptively changed based upon the position of another data field clipped.

G. Rotation of Image Signal

The image processor 24 uses well known prior art techniques for this processing.

More specifically, the image processor 24 receives a single image signal (stored as a bit map file) for each single page of document faxed by the facsimile 12 and received by the fax server 16 or scanned by the scanner 17. From the image signal, representative of a single page document, the image processor 24 clips that image signal into one or more fragmented image signals. Each of the fragmented image signals represents an image signal of that portion of the single page document having relevant alphanumeric character data printed or written on the document. The fragmented image signals are placed on a blank background to enhance character recognition and key entry and is compressed in accordance with CCITT Group 3 standard.

Initially, when the image processor 24 receives an image signal, it must first perform the function of recognizing the following classes of documents:

a. HCFA-1500 claim forms;

b. Other types of non-HCFA-1500 claim forms;

c. Supporting materials.

The image processor 24 recognizes the template of the form by any one of the methods described hereinabove. In the preferred embodiment, the form or the template is recognized by matching the image signal with any one of a number of pre-defined form types stored in a database.

Image processor outputs two classes of data files: a supporting material file and a processed image file. For all the image signals which are either unrecognizable or are recognized as supporting material, the image signals are stored in that file, which are used by the filing work station 36 for manual intervention (discussed in greater detail hereinafter).

With respect to the image signals which the image processor 24 recognizes as corresponding to a health claim form, the image processor 24 performs the following function on each of the image signals, corresponding to a health claim document:

Orientation

Speckle removal

Deskewing

Registration

Bar code interpretation, if present

Image enhancement

Field clipping

The fragmented image signals generated by the image processor 24 for each single page document are clipped, compressed and written out as a single data file. Associated with each fragmented image signal in a file are the coordinates of the smallest rectangle which completely encloses the graphical image of the fragmented image signal, that portion of the health claim document which contains the relevant information. This bounding rectangle is given in the coordinates space of the original page and can be used to reconstruct image sections that span several fields.

In addition, if the TTI or the ANI of the provider is known, the image processor 24 can improve the image signal by eliminating predictable noises from the communication medium from the particular provider.

Again, since the system 10 can be modularly upgraded, a plurality of image processors 24 can be attached to the bus 20. With a plurality of image processor 24 requesting files from the file server 22, the data files on the file server 22 must be uniquely named or identified so the contention by different image processors 24 is avoided.

Finally, the image processor 24 appends a block of statistical data to each file it generates. Included in this block of statistical data are data for:

A. The number of claims in each batch processed.

B. The number of image clips and their location and size.

In the preferred embodiment, the image processor 24 executes the application program set forth in the microfiche appendix Exhibit C. In addition, the image processor 24 executes the DOES program interfacing the application program of Exhibit C with the user.

Character Recognition Processor

The character recognition processor 26 is also an IBM PC compatible computer connected to the communication bus 20 via ethernet interface card. A plurality of the character recognition processors 26 can be connected to the bus 20.

The character recognition processor 26 reads files from the file server 22 until a file used by the image processor 24 to store fragmented images therein is found. Once that file is found, the character recognition processor 26 locks it, and moves it into its subdirectory to prevent contention. There it is opened and it remains in that subdirectory. When processing is completed, the file is closed and is moved to a subdirectory which is accessible by the clarification work station processor 28.

As previously stated, each file opened by the character recognition processor 26 contains one or more fragmented image signals, processed by the image processor 24. The character recognition processor 26 attempts to recognize the ASCII characters within the fragmented image signal. For each ASCII character, it generates a confidence level for that character. In addition, based upon the location of the fragmented image signal, the character signal recognized by the processor 26 is stored in its associated meaning field. Finally, the location and the size of the character is noted by the character recognition processor 26. Thus, for each fragmented image signal, a corresponding file containing the most likely ASCII character, the confidence level for each character and the location and size of each character is generated.

In the preferred embodiment, the character recognition processor 26 uses a software decompression algorithm to decompress the fragmented image signals, which were compressed in accordance with the CCITT Group 3. Alternatively, a high speed decompression add-on board, such as that from Xionics of England can be used to speed the decompression of the fragmented images.

In the preferred embodiment, the character recognition processor 26 executes the application program set forth in the microfiche appendix Exhibit D. In addition, the character recognition processor 26 executes the DOES program interfacing the application program of Exhibit D with the user.

Clarification Work Station

The clarification work station 28 receives the character signals stored on the file server 22. The clarification work station is an IBM PC compatible computer, executing appropriate software for image decompression. A plurality of the work station 28 may be connected to the bus 20.

In operation, the work station 28 accesses the character signals from the file server 22 and compares them to a data base also stored on the file server 22. The confidence level of the different character signals are modified in accordance with the comparison between the comparison signals and the data base. For example, if the meaning of the character signal is "place of service" is determined not to be among the codes in the data base, the confidence level for that character string is lowered. Only character signals with a modified confidence level below some user set threshold are then presented to the operator for correction. In addition, the corresponding fragmented image signal is also presented on the display for the operator to decipher the "original" image.

Thus, the clarification work station 28 affords a human operator the first opportunity to inspect the results of fully automated processing by system 10 wherein the system 10, based upon some preselected users threshold, will display the exceptions to the processing. The operator at the clarification work station will, therefore, receive those fragmented image signals of the character signals which the system 10 has difficulty to decipher or is unable to decipher such that the confidence level is below some user set threshold.

In addition, the clarification work station can clarify character signals of low confidence from the character recognition processor 26 through an external data base reference based upon a character signal having a high confidence level. Thus, for example, if a name field contains character signals that have low confidence level, the confidence level of the name field may be increased if the corresponding account number field has a high confidence level and is found on the data base. If the account number field has a high confidence level and is found among the data base, then the corresponding name from the data base, is then used to replace the name field of the character signals having low confidence level generated by the character recognition processor 26. This then is a method of increasing the confidence level of the character signals having low confidence level to a high confidence level based upon a successful comparison of a high confidence level of other character signals. Remaining character signals of low confidence are presented to the human operator in conjunction with the original fragmented image so as to as yet again improve the readable or recognition of the original characters.

Thus, the confidence level of the recognition of the alphanumeric characters is improved by knowing the type of template or form upon which the characters were printed on the document faxed. By knowing the template or form of the document faxed, and the type of character data in a particular field of interest of the template or form, such as the first name, the character recognition processor 26, can compare the fragmented image signal with a database file of ASCII characters containing the expected data, such as commonly used first names, to improve the character recognition.

Furthermore, for applications where data can be cooperatively generated, the character recognition can be improved if the characters were faxed with an appended, one or more correction characters, for error checking purpose. For example, if the data characters consist of the character stream "JOHN", as is well known, each of the characters "J", "O", "H", and "N", has an ASCII bit stream. The collective character stream would have a total bit stream value. Using any of the well known error encoding techniques, such as CRC (Cyclical Redundancy Check) or parity check, the total bit stream value can be encoded into an encoded binary stream representing one or more "error checking" characters. These "error checking" characters are then printed, adjacent to but spaced apart from the data characters. Thus, the data characters and error checking characters, might be printed as "JOHN R".

The character recognition processor 26 would then attempt to determine the data characters and the error checking characters. However, if it appears that during the facsimile transmission of the data characters "JOHN" was received as "JCHN", then the error checking character "R" can be used to correct and restore the data characters "JOHN".

In the preferred embodiment, the clarification work station 28 executes the application program set forth in the microfiche appendix Exhibit E. In addition, the clarification work station 28 executes the DOES program interfacing the application program of Exhibit E with the user.

Validation Work Station

The validation work station 30 is also an IBM compatible PC computer with an internal image decompression board, such as that manufactured by Xionics of England, which provides image display quickly enough to avoid key entry delays.

Similar to the clarification work station 28, the validation work station 30 attempts to detect and correct character signals which have been recognized by the character recognition processor 26 and as modified by the clarification work station 28. However, the mechanism by which the validation work station 30 corrects the errors differs from the clarification work station 28.

The validation work station 30 uses a rules base to evaluate the claim data. The rules base is embodied in one or more data files stored on the file server 22. The data files encode all relationship between fields that are analyzed by the validation work station 30. One example of a table driven expert system is the validation work station 30 using diagnosis codes compared to procedural codes to ensure that the billed treatment is relevant to the described disease. This comparison is applied even to those character signals having high confidence level from clarification work station 28. Thus, although the clarification work station 28 serves to simply ensure that this transcription of the character signal from original fragmented image signal is correctly transcribed into character signal, the validation work station 30 gives meaning to the transcription to ensure that which is intended by the health care provider in filling out the claim form. The validation workstation displays the full original image along with a data template containing the data results provided by the clarification workstation. Problem fields are highlighted and the user is presented with diagnostic messages derived from the embedded rule base.

In the preferred embodiment, the validation work station 28 displays the full original image along with a data template containing the data results provided by the clarification work station 28. Problem fields are highlighted and the user is presented with diagnostic messages derived from the embedded rule base. The validation work station 28 executes the application program set forth in the microfiche appendix Exhibit F. In addition, the validation work station 28 executes the DOES program interfacing the application program of Exhibit F with the user.

Gateway

The gateway 32 is the connection point between the system 10 and a claims processing system running on a mainframe computer 40. The gateway 32 is responsible for reading claim batches and formatting that data into electronic transactions with the mainframe computer 40. The gateway 31 consists of an IBM PC compatible computer with a mainframe communications adapter. The communications adapter is implementation specific depending on the mainframe computer 40 to which it is attached. In the preferred embodiment, it is a communication adapter board from Eicon of Montreal, Canada.

Once the gateway 32 is started, it searches an input queue in a pre-assigned directory on the server 32 for batch files ready for transmission to the mainframe computer 40. At a pre-determined time, the gateway 32 formats the claim data according to the requirement of the mainframe computer 40 and transmits the batch. When the mainframe acknowledges correct receipt of the data, the file is then deleted from the file server 22. The gateway 32 can communicate and translate image signals, character signals, or processed character signals between the communication bus 20 and the mainframe 40.

At a predetermined time the gateway 32, if it is to be connected to an IBM mainframe computer 40, can execute the application program set forth in the microfiche appendix Exhibit G. In addition, it executes the DOES software to interface the software of Exhibit G with the file server 22 and the network 10.

Supervisor Processor

The supervisor processor 34 performs supervisory functions to maintain the system 10. It can add and remove users. It can also trigger periodic processes. It can also change system configuration. Finally, it monitors activity logs, controls unattended processors, views the status of all images in the system, generates reports, and updates databases used by the system 10.

In the preferred embodiment, it executes the application program set forth in the microfiche appendix Exhibit H. It also executes the DOES software which interfaces the software of Exhibit H with the user.

Filing Work Station

The filing work station 36 is an IBM PC compatible computer to which all non-claims forms from the image processor 24 are directed. It has a Xionics decompression board. An operator views the image data and either passes the nonclaim documents to the print server 38 for printing or sends misrouted claim forms back to the character recognition work station 26. This is accomplished by storing it back on the file server 22 in the subdirectory where the character recognition work station 26 would pick up its files for processing.

The filing work station 36 comprises of a program to display the images found in its subdirectory on the file server 22. It performs the functions of hardware decompression, template overlay for printing, and rotation, zoom, and scroll. If the operator who views that image on the screen of the filing work station 36 determines that it is a non-claims document, that document is simply sent to the print server 38 is printed and is then deleted from the file server 22. If that display document is a claims document, then it is stored back on the file server 22 under the appropriate subdirectory where the character recognition processor 26 would retrieve it for further processing.

In the preferred embodiment, it executes the application program set forth in the microfiche appendix Exhibit I. It also executes the DOES software which interfaces the software of Exhibit I with the user.

Print Server

The print server 38 is an IBM compatible computer with an attached laser printer, to print out paper copies of images that are not claim documents and to print various administrative reports with regard to the uses of the system 10. It retrieves files that are contained in a particular subdirectory on the file server 22 and as the document is printed, the files are removed from that particular subdirectory.

In the preferred embodiment, it executes the application program set forth in the microfiche appendix Exhibit J. It also executes the DOES software which interfaces the software of Exhibit J with the user.

From the foregoing, it can be seen that a modular document processing system is disclosed having independent modular processing units which can be added or removed from a network. In addition, the processing system 10 has various components of character recognition and allowance for user intervention. Finally, the system 10 implements a method of completing a task, by subdividing the task into a plurality of sub-tasks with each of the sub-tasks being executed by one or more general purpose computers, executing programs to accomplish each of the sub-tasks.

Figure 2:
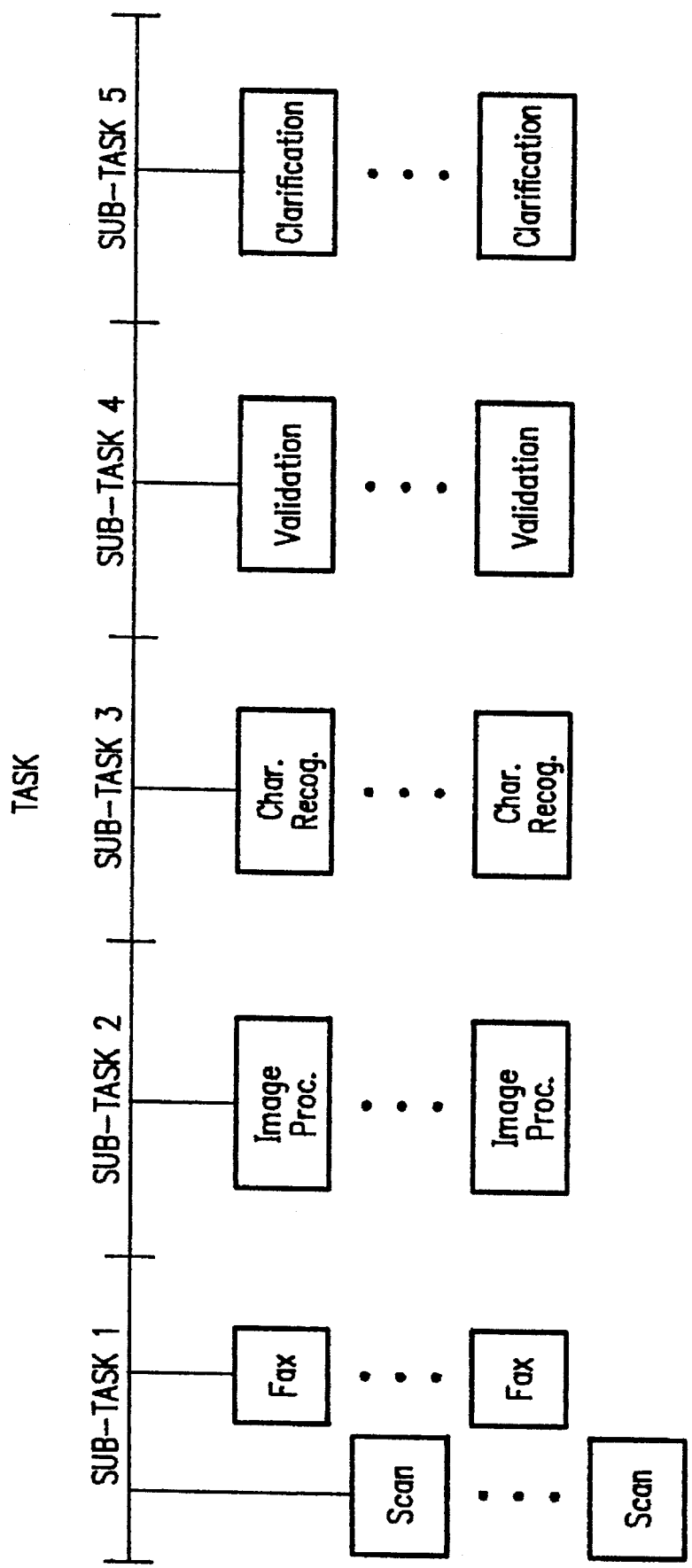
FIG. 2 is a flow diagram of the method of distributive processing of the present invention.

Referring to FIG. 2 there is shown a flow diagram of the method of the present invention wherein a task is divided into a plurality of sub-tasks and is distributively processed by a plurality of processor. As can be seen from FIG. 2, the task of document processing can be divided into a plurality of sub-tasks. A number of processing elements can be provided in each of the sub-tasks to accomplish the goals of the sub-task. Further, each of the sub-tasks performs its task independently of the other sub-task processing elements. In this manner, the method and apparatus of the present invention permits modular expansion to accommodate demands in the over all task processing.

What is claimed is:

1. A modularly expandable document processing system for processing a plurality of documents, having information fixed thereon with a first portion of said information being alphanumeric characters to generate recognition character signals, representing said alphanumeric characters, said system comprising:

a communication bus means;

means for converting each of said plurality of documents into an image signal; said converting means modularly and electrically connected to said communication bus means for supplying said image signal thereto;

means for processing said image signal to produce a plurality of character signals and their associated meaning, said plurality of character signals represent said image signal at said first portion; said processing means modularly and electrically connected to said communication bus means for receiving said image signal therefrom and for supplying said character signals thereto;

means for analyzing said plurality of character signals and for assigning a confidence level to each of said plurality of character signals, and for displaying those character signals having a confidence level below a threshold for manual alteration by a user to produce processed character signals; said analyzing means modularly and electrically connected to said communication bus means for receiving said plurality of character signals therefrom and for supplying said processed character signals thereto;

means for storing said image signal, plurality of character signals, and said processed character signals; said storing means modularly and electrically connected to said communication bus means; and means for generating said recognition character signals from said plurality of character signals and said processed character signals; said generating means modularly and electrically connected to said communication bus means for receiving said plurality of character signals and processed character signals therefrom and for supplying said recognition character signals thereto.

2. The system of claim 1 further comprising:

means for transmitting said processed character signals to a second processing means for further processing; said transmitting means modularly and electrically connected to said communication bus means for receiving said processed character signals therefrom.

3. The system of claim 1 wherein said converting means is an optical scanner means for optically converting each document into an image signal.

4. The system of claim 1 wherein said converting means is a facsimile means for converting each document into a communication signal for transmission over a communication medium, and means for receiving said communication signal and for converting said received communication signal into an image signal.

5. The system of claim 4 wherein said documents have a second portion of said information being in the nature of a form.

6. The system of claim 5 wherein said processing means further comprises:

first means for processing said image signal to produce a processed image signal, said processed image signal representing an enhanced image of said document; said first processing means modularly and electrically connected to said communication bus means for receiving said image signal therefrom and for supplying said processed image signal thereto; and second means for processing said processed image signal to produce said character signals, said second processing means modularly and electrically connected to said communication bus means for receiving said processed image signal therefrom and for supplying said character signals thereto.

7. The system of claim 6 wherein said first processing means comprises:

means for extracting portions of said image signal representing speckles in said document generate a first image signal;

means for enhancing the resolution of said first image signal to generate a second image signal; and means for removing portions of said second image signal representing said second portion of said information to produce said processed image signal.

8. The system of claim 7 wherein said first processing means processes said image signal based upon an a priori knowledge of the characteristics of said communication medium.

9. The system of claim 4 wherein said analyzing means further comprises:

means for displaying a portion of said image signals corresponding to the displayed character signals.

10. The system of claim 9 wherein said analyzing means further comprises:

means for comparing said character signals to an a priori determined database to obtain a confidence level for said character signals.

11. The system of claim 10 wherein said analyzing means further comprises:

means for automatically altering a first character signal having a low confidence level to a processed character signal having a high confidence level by replacing said first low confidence level character signal by said processed character signals from a first field in a database; said database having a second field corresponding to a second character signal having a high confidence level, said first and second character signals being from the same document.

12. The system of claim 10 wherein said receiving means is a second facsimile means having means for transmitting a character signal through said communication medium to said first facsimile means.

13. The system of claim 12 further comprising:

means for activating said second facsimile means to transmit to said first facsimile means a character signal having low confidence level.

14. The system of claim 1 wherein said documents have a second portion of said information being in the nature of a form.

15. The system of claim 14 wherein said processing means further comprises:

first means for processing said image signal to produce a processed image signal, said processed image signal representing an enhanced image of said document; said first processing means modularly and electrically connected to said communication bus means for receiving said image signal therefrom and for supplying said processed image signal thereto; and second means for processing said processed image signal to produce said character signals, said second processing means modularly and electrically connected to said communication bus means for receiving said processed image signal therefrom and for supplying said character signals thereto.

16. The system of claim 15 wherein said first processing means comprises:

means for extracting portions of said image signal representing speckles in said documents to generate a first image signal;

means for enhancing the resolution of said first image signal to generate a second image signal; and means for removing portions of said second image signal representing said second portion of said information to produce said processed image signal.

17. The system of claim 1 wherein said analyzing means further comprises:

means for displaying a portion of said image signal corresponding to the displayed character signals.

18. The system of claim 17 wherein said analyzing means further comprises:

means for comparing said character signals to an a priori determined database to obtain a confidence level for said character signals.

19. The system of claim 18 wherein said analyzing means further comprises:

means for automatically altering a first character signal having a low confidence level to a processed character signal having a high confidence level by replacing said first low confidence level character signal by said processed character signals from a first field in a database; said database having a second field corresponding to a second character signal having a high confidence level, said first and second character signals being from the same document.

20. A method of processing a document having information fixed thereon with a first portion of said information being alphanumeric characters to generate recognition character signals, representing said alphanumeric characters and with a second portion of said information being form information; said method comprising:

converting said document into an image signal;

processing said image signal to produce an enhanced image signal by extracting portions of said image signal representing speckles in said document to generate a first image signal; enhancing the resolution of said first image signal to generate a second image signal; removing portion of said second image signal representing said form information to generate said enhanced image signal;

processing said enhanced image signal to produce a plurality of character signals, and their associated meaning; said plurality of character signals represent said image signal at said first portion;

analyzing each of said plurality of character signals and assigning a confidence level thereto;

displaying those character signals having a confidence level below a threshold for manual alteration by a user to produce processed character signals; and processing said character signals and processed character signals to generate recognition character signals.

21. The method of claim 20 further comprising:

transmitting said character signals and processed character signals to a first processing means for processing said transmitted character signals and processed character signals.

22. The method of claim 20 wherein said converting step comprises:

optically scanning said document to produce an image signal.

23. The method of claim 20 wherein said converting step comprises:

converting said document into a communication signal;

transmitting said communication signal over a communication medium;

receiving said communication signal over a communication medium; and converting said received communication signal into said image signal.

24. The method of claim 23 wherein said processing step to produce said enhanced image signal further comprises:

enhancing said image signal based upon a priori knowledge of the characteristics of said communication medium.

25. The method of claim 23 wherein said analyzing step further comprises:

displaying a portion of the image signal corresponding to the displayed character signals.

26. The method of claim 25 wherein said analyzing step further comprises:

comparing each character signal to an a priori determined database to obtain a confidence level for said character signal.

27. The method of claim 26 wherein said analyzing step further comprises:

automatically altering a first character signal having a low confidence level to a processed character signal having a high confidence level by replacing said first low confidence level character signal by said processed character signal from a first field in a database; said database having a second field corresponding to a second character signal having a high confidence level with said first and second character signals being from the same document.

28. The method of claim 27 further comprising the step of:

transmitting said character signal having a low confidence level through said communication medium to the source which converted said document into a communication signal.

29. The method of claim 20 wherein said analyzing step further comprises:

displaying a portion of the image signal corresponding to the displayed character signals.

30. The method of claim 20 wherein said analyzing step further comprises:

comparing each character signal to an a priori determined database to obtain a confidence level for said character signal.

31. The method of claim 30 wherein said analyzing step further comprises:

automatically altering a first character signal having a low confidence level to a processed character signal having a high confidence level by replacing said first low confidence level character signal by said processed character signal from a first field in a database; said database having a second field corresponding to a second character signal having a high confidence level with said first and second character signals being from the same document.

32. A method of processing a document having information fixed thereon with a first portion of said information being alphanumeric characters to generate recognition character signals, representing said alphanumeric characters and with a second portion of said information being form information; said method comprising:

converting said document into an image signal;

processing said image signal to produce an enhanced image signal;

processing said enhanced image signal to produce a plurality of character signals, and their associated meaning; said plurality of character signals represent said image signal at said first portion;

analyzing each of said plurality of character signals by comparing each character signal to an a priori determined database to obtain a confidence level for said character signal; and automatically altering a first character signal having a low confidence level to a processed character signal having a high confidence level by replacing said first low confidence level character signal by said processed character signal from a first field in a database; said database having a second field corresponding to a second character signal having a high confidence level with said first and second character signals being from the same document;

displaying those character signals having a confidence level below a threshold for manual alteration by a user to produce processed character signals; and processing said character signals and processed character signals to generate recognition character signals.

33. The method of claim 32 further comprising:

transmitting said character signals and processed character signals to a first processing means for processing said transmitted character signals and processed character signals.

34. The method of claim 32 wherein said converting step comprises:

optically scanning said document to produce an image signal.

35. The method of claim 32 wherein said converting step comprises:

converting said document into a communication signal;

transmitting said communication signal over a communication medium;

receiving said communication signal over a communication medium; and converting said received communication signal into said image signal.

36. The method of claim 35 wherein said processing step to produce said enhanced image signal further comprises:

enhancing said image signal based upon a priori knowledge of the characteristics of said communication medium.

37. The method of claim 36 wherein said processing step to produce said enhanced image signal further comprises:

extracting portions of said image signal representing speckles in said document to generate a first image signal;

enhancing the resolution of said first image signal to generate a second image signal; and removing portion of said second image signal representing form information to generate said enhanced image signal.

38. The method of claim 32 wherein said analyzing step further comprises:

displaying a portion of the image signal corresponding to the displayed character signals.

39. The method of claim 38 further comprising the step of:

transmitting said character signal having a low confidence level through said communication medium to the source which converted said document into a communication signal.

* * * * *